(12) United States Patent
Landes et al.

(10) Patent No.: US 9,985,378 B2
(45) Date of Patent: May 29, 2018

(54) LIQUID EXTRACTION MODULE, LIQUID TANK

(75) Inventors: Ewgenij Landes, Remseck (DE); Steffen Schott, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 1377 days.

(21) Appl. No.: 13/994,659

(22) PCT Filed: Dec. 9, 2011

(86) PCT No.: PCT/EP2011/072341
§ 371 (c)(1),
(2), (4) Date: Jun. 14, 2013

(87) PCT Pub. No.: WO2012/080132
PCT Pub. Date: Jun. 21, 2012

(65) Prior Publication Data
US 2013/0280958 A1    Oct. 24, 2013

(30) Foreign Application Priority Data

Dec. 14, 2010  (DE) .......................... 10 2010 062 985

(51) Int. Cl.
*F01N 3/00*   (2006.01)
*H01R 13/46*  (2006.01)
*F01N 3/20*   (2006.01)

(52) U.S. Cl.
CPC ........... *H01R 13/46* (2013.01); *F01N 3/2066* (2013.01); *F01N 2610/14* (2013.01);
(Continued)

(58) Field of Classification Search
CPC ... H01R 13/46; F01N 3/2066; F01N 2610/14; F01N 2610/1406; Y02T 10/24
(Continued)

(56) References Cited

U.S. PATENT DOCUMENTS 4,533,194 A   8/1985  Boichut et al.
5,637,010 A   6/1997  Jost et al.
(Continued)

FOREIGN PATENT DOCUMENTS

DE   102006027487   3/2007
DE   102008040843   2/2010
(Continued)

OTHER PUBLICATIONS

International Search Report for Application No. PCT/EP2011/072341 dated Mar. 8, 2012 (2 pages).

*Primary Examiner* — Jacob K Ackun
*Assistant Examiner* — Jenine Pagan
(74) *Attorney, Agent, or Firm* — Michael Best & Friedrich LLP

(57) ABSTRACT

The invention relates to a liquid extraction module (1) for extracting liquid from a liquid tank, in particular of an exhaust-gas aftertreatment system of a motor vehicle, having an insert part (2) which is produced at least substantially from plastic and which has at least one extraction opening (5) and at least one plug connector (14) for the electrical contacting of an electrical consumer (10, 7) of the liquid extraction module (1). It is provided that a housing (16) of the plug connector (14) is formed separately and has at least one encapsulated undercut (22, 32) for fastening to the insert part (2).

13 Claims, 3 Drawing Sheets

(52) U.S. Cl.
CPC ... *F01N 2610/1406* (2013.01); *Y02A 50/2325* (2018.01); *Y02T 10/24* (2013.01)

(58) Field of Classification Search
USPC .................. 60/286, 295, 301, 303; 123/509
See application file for complete search history.

(56) References Cited

U.S. PATENT DOCUMENTS

| | | | |
|---|---|---|---|
| 2006/0120893 A1 | 6/2006 | Yagi et al. | |
| 2008/0058770 A1* | 3/2008 | Heinz | A61J 1/2096 604/533 |
| 2009/0065508 A1 | 3/2009 | Haeberer et al. | |
| 2009/0229258 A1* | 9/2009 | Zapf | F01N 3/2066 60/295 |
| 2010/0025069 A1 | 2/2010 | Smith, III et al. | |
| 2010/0107615 A1* | 5/2010 | Chmielewski | F01N 3/2066 60/303 |
| 2013/0263941 A1* | 10/2013 | Landes | F01N 3/2066 137/351 |
| 2013/0321696 A1* | 12/2013 | Bae | H04N 5/2252 348/372 |

FOREIGN PATENT DOCUMENTS

| | | |
|---|---|---|
| DE | 102008043197 | 4/2010 |
| EP | 1925354 | 8/2012 |

\* cited by examiner

LIQUID EXTRACTION MODULE, LIQUID TANK

BACKGROUND OF THE INVENTION

The invention relates to a liquid extraction module for extracting liquid from a liquid tank, in particular of an exhaust-gas aftertreatment system of a motor vehicle, having an insert part which is produced at least substantially from plastic and which has at least one extraction opening and at least one plug connector for the electrical contacting of an electrical consumer of the liquid extraction module.

The invention further relates to a liquid tank, in particular for exhaust-gas aftertreatment systems of a motor vehicle, having a tank opening and comprising a liquid extraction module, which is disposed in/on the liquid tank so as to close the tank opening and which has an extraction opening associated with the tank interior and at least one plug connector, which is accessible from the outside, for the electrical contacting of an electrical consumer of the liquid extraction module.

TECHNICAL FIELD

Liquid extraction modules as well as liquid tanks of the type mentioned above are known from the prior art. A liquid tank, in which a liquid extraction module can be inserted for extracting liquid from the liquid tank, is known, for example, from the published German patent specification DE 10 2006 027 487 A1. The extraction module comprises an extraction opening, through which the liquid can be withdrawn by suction. A delivery device, which draws the liquid through the extraction opening, furthermore belongs to the liquid extraction module. An electrical connection, which at least supplies current to the delivery device, is therefore necessary to operate the liquid extraction module. To this end, it is known to provide the liquid extraction module with a plug connector which is accessible from the outside and to which a mating connector can be connected by means of a plug connection. The liquid extraction module can thus, for example, be easily replaced for maintenance purposes.

SUMMARY OF THE INVENTION

The inventive liquid extraction module has the advantage with respect to the known liquid extraction modules that the plug connector is very resilient and permanently ensures the leak tightness of the system.

The inventive liquid extraction module is characterized in that a housing of the plug connector is formed separately and has at least one encapsulated undercut for fastening to the insert part. The plug connector and the insert part are therefore embodied as two separate parts of the liquid extraction module. As a result, each of the parts, the plug connector and the insert part, can be optimally matched in terms of material technology to the tasks respectively associated therewith. If two different materials are provided, a materially bonded connection between the plug connector and the insert part can only be produced with a large amount of extra effort and expense. Provision is therefore made according to the invention for the housing of the plug connector to have an undercut, which is encapsulated for fastening to the insert part. The undercut is preferably encapsulated by the insert part; thus enabling the plug connector or, respectively, the housing of the plug connector to be initially produced during manufacture and the insert part to be subsequently sprayed around the undercut of the housing, whereby a form-fitting and force-fitting connection between the insert part and the plug connector is produced. The plug connector can now be produced from a material, which is mechanically resilient and has a long service life, independently from the insert part. The leak tightness between plug connector housing and insert part is increased by the additional use of at least one bonding agent in the material of at least one of the two components. By means of the bonding agent, a solid and particularly leak-tight connection results between the two materials which also can consist of different plastics or inorganic materials. It is particularly advantageous for at least maleic anhydride to be used as the bonding agent in at least one plastic material. As a result, a particularly good seal tightness should be achieved which is sufficient/suitable for the plug connectors in motor vehicle construction.

According to a preferred embodiment of the invention, provision is made for the undercut of the housing to be encapsulated by an intermediate piece, which is/can be connected to the insert part in a materially bonded manner. Provision is therefore made according to the preferred embodiment for the housing of the plug connector not to be directly encapsulated by the material of the insert part but by the material of an intermediate piece in the region of the undercut; thus enabling the intermediate piece and the housing of the plug connector to be connected to one another in a form-fitting and force-fitting manner. The intermediate piece is itself made from a material which can be connected to the material of the insert part in a materially bonded manner, in particular can be welded to said material of the insert part. The intermediate piece is preferably made from the same material as the insert part. In this way, the housing of the plug connector can be adapted in terms of material technology to the demands of the plug connection and nevertheless can subsequently be reliably and fixedly connected to the insert part.

The material of the plug connector is preferably made of another material than that of the insert part and the intermediate piece of the same material as the insert part.

The undercut of the housing is preferably aligned so as to act in the plugging direction; thus enabling a form-fitting connection to exist between the housing and the intermediate piece or the insert part in the direction in which the forces occur when assembling or disassembling the plug connection.

According to an advantageous modification to the invention, provision is made for the undercut to extend over the entire width of the housing of the plug connector, in particular over the entire circumference of the housing. In so doing, the plug connector is extremely resilient to stress without the connection between plug connector and insert part or, respectively, intermediate piece being damaged.

The undercut is preferably configured as a recess in the housing of the plug connector. It is also conceivable for a plurality of recesses adjacent to one another to be provided, which together form the undercut. Instead of a recess, it is also conceivable for one or a plurality of projections, which are surrounded by the sprayed material, to be provided on the outer periphery of the housing. In a particularly preferred manner, a combination of at least one recess and at least one projection is also conceivable.

In a particularly preferred manner, the housing of the plug connector has at least one expansion, which, viewed in cross-section, is funnel-shaped and forms the undercut. The funnel-shaped expansion is thereby preferably divergently aligned in the direction of the insert part so that the undercut is formed by the outer side of the expansion. An opposite alignment of the expansion is of course also theoretically conceivable. The expansion extends along two imaginary planes aligned transversely to one another so that said expansion is open on the end sides thereof and forms two opposite walls aligned at an angle to one another. According to an alternative embodiment, the funnel-shaped expansion is formed to be point symmetrical with respect to a longitudinal axis, and therefore the expansion comprises a funnel having a side wall which extends over the entire circumference thereof.

The insert part and/or the intermediate piece are preferably made of a high-density polyethylene plastic (HDPE plastic) whereby a high degree of dimensional stability, durability and sustainability are ensured. It is particularly advantageous if at least one bonding agent is contained in the HDPE plastic used, and in particular at least maleic anhydride is contained therein as bonding agent.

The housing of the plug connector is preferably made from polyamide, in particular with glass fiber reinforcement. The polyamide ensures a durability of the plug connector even under high stresses as caused by vibrations, transverse forces and axial forces and is suitable for plug connections.

The inventive liquid tank is characterized by a liquid extraction module which is designed according to one of the embodiments described above. The advantages already described above result from this fact.

BRIEF DESCRIPTION OF THE DRAWINGS

The invention is explained below in detail with the aid of the drawings. In the drawings.

DETAILED DESCRIPTION

Figure 1:
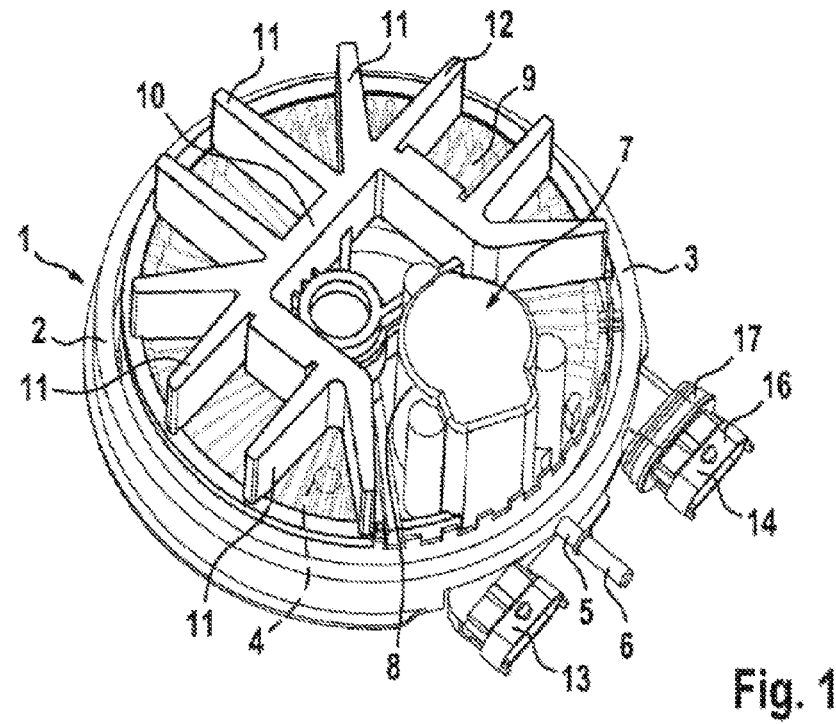
FIG. 1 shows a liquid extraction module for extracting liquid from a liquid tank in a perspective view.

FIG. 1 shows a liquid extraction module 1 for extracting liquid from a liquid tank. The liquid extraction module 1 has an insert part 2 which is produced from high-density polyethylene plastic (HDPE). In the present embodiment, the insert part 2 has a circular base surface and is configured for insertion into a tank opening in such a manner that it is tightly welded with an axial contact surface 3, which extends over the outer periphery of said insert part 2, to the tank wall comprising the tank opening or, for example, rests tightly with said axial contact surface 3 against an elastic element. The insert part 2 has an extraction opening 4 which is configured in the bottom of said insert part 2 and opens into an extraction channel 5 of the delivery device 7, said extraction channel leading to a connecting tube 6. In the assembled state, i.e. if the liquid extraction module 1 is mounted to the liquid tank, the connecting tube 6 is located on the outside of the liquid tank so as to be accessible from the outside. A delivery device 7, which is disposed in a tub-shaped receptacle 8, is associated with the extraction channel 5. The tub-shaped receptacle 8 thereby extends in the direction of the tank interior; thus enabling said receptacle 8 to form a housing protecting the delivery device from the liquid situated in the liquid tank. The delivery device advantageously comprises a delivery pump, which is connected at the intake side thereof to the extraction opening 4 and at the delivery side thereof to the connecting tube 6 via the extraction channel 5. In addition, the insert piece 2 supports a filter element 9, which extends substantially across the entire bottom of said insert piece 2 and is associated with the extraction opening 4 such that liquid which is drawn by suction into said extraction opening 4 has to initially pass the filter element 9 or more precisely the filter fabric of the filter element 9. A heating element 10, which has a plurality of heating arms 11, is furthermore disposed above the filter element 9. The heating element 10 is embodied as an electrically operated heating element 10 which has at least one, preferably two or more, PTC heating element(s) that are associated with an aluminum base body, said aluminum base body and PTC heating elements being enclosed by a plastic encapsulation 12. Whereas the delivery device 7 is introduced into the receptacle 8 of the insert part 2 as an assembly and comprises its own connecting plug 13 as well as the connecting tube 6, the electrical connecting cables connected to the PTC heating elements and the fill level sensor are fed to a plug connector 14 of the insert part 2.

Figure 2:
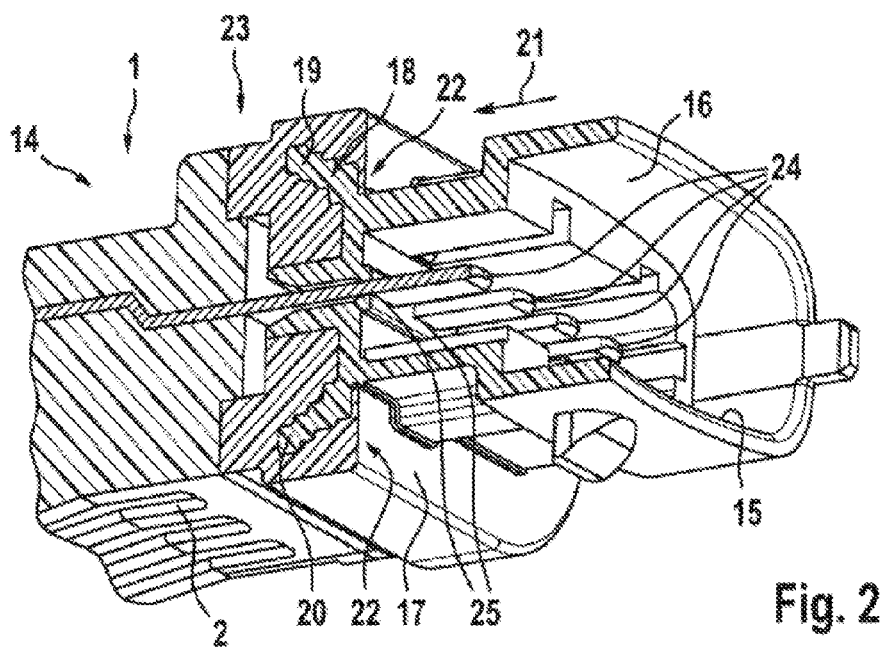
FIG. 2 shows a plug connector of the liquid extraction module in a perspective sectional view.

FIG. 2 shows the plug connector 14 in an enlarged, perspective sectional view. The plug connector 14 is formed separately from the insert part 2 and forms a plug receptacle 15. To this end, the plug connector 14 comprises a housing 16 which is configured on a free end thereof to be open to the receptacle of a plug and is encapsulated by an intermediate piece 17 at the other end thereof. The housing 16 therefore has a funnel-shaped expansion 18 on the end thereof facing the insert part 2, said expansion being aligned so as to widen in the direction of said insert part 2. The expansion 18 therefore forms at least two walls 19, 20 which are aligned at an angle to one another and extend across the width of the housing 16. The walls 19 and 20 or, respectively, the expansion 18 thereby form an undercut 22, when viewed in the plugging direction as indicated by an arrow 21. The housing 16 is encapsulated by the intermediate piece 17 in the region of the undercut 22 or, respectively, the expansion 18; thus enabling a form-fitting connection to exist between the housing 16 and the intermediate piece 17, in particular in the plugging direction. By the term plugging direction, the force direction is also to be understood, which is present when assembling the plug connection as well as the force direction which is present when a plug is disconnected from the plug connection 14, i.e. pulled out of said plug connection 14 oppositely to the direction indicated by the arrow 21. The intermediate piece 17 is preferably produced from a material which can be welded to the material of the insert part 2. In a particularly preferred manner, the intermediate piece 17 is produced from the same material as the insert part 2. In order to connect the two component plug comprising the housing 16 and the intermediate piece 17 to the insert part 2, said intermediate piece 17 is welded to the insert part 2 at the end thereof facing said insert part 2 at a contact point 23. The contact point 23 thereby extends preferably around the electrical connecting cables or contacts 24 which protrude into the plug receptacle 15 of the housing 16. Said connecting cables or contacts 24 are embedded in the insert part 2, respectively encapsulated by the same. The housing 16 has a through-passage 25 for each of said connecting cables or contacts 24 or lead frames, through which said connecting cables enter into the plug receptacle 15.

Due to the advantageous configuration of the liquid extraction module 1, the housing of the plug connector 14 can be produced from any desired material, in particular from a plastic which is suitable for the plug connection, resilient and which could be welded to the plastic of the insert part 2 without or only with a great deal of additional effort. By interposing the weldable intermediate piece 17, a solid and secure connection of the plug connector 14 to the insert part 2 is ensured in a simple manner. The housing 16 is preferably produced from a polyamide, in particular with glass fiber reinforcement. The intermediate piece 17 is preferably produced from the same material as the insert part 2 or from another material that can be welded to said insert part 2, such as, for example, polyolefins, in particular high-density polyethylene or polypropylene. In a particularly preferred manner, the undercut and the plug receptacle 15 are spaced apart from one another in the plugging direction. It is thereby ensured that the intermediate piece is not located in a region in which it can influence the electrical interface. In order to ensure a leak-tight connection between the housing 16, the intermediate piece 17 and/or the insert part 2, at least one of the plastic materials is advantageously enhanced with an additive, such as a bonding agent. A leak-tight connection must meet the leak tightness requirements for electrical plugs in motor vehicles. In particular, the leak tightness requirements for plugs in the proximity of the floor and in the engine compartment should be met. It is particularly preferred if maleic anhydride (MAH) is used as the bonding agent in HDPE material (for example for intermediate piece 17 or insert part 2) in order to produce a leak-tight connection to the polyamide material (for example for housing 16). It is advantageous if initially the polyamide or another material is produced first and subsequently HDPE or another material having a lower melting temperature is immediately sprayed on the still "warm" part. In the event that an immediate encapsulation should not be possible for technical reasons, a preheating outside of and/or in the tool can bring advantages with respect to leak tightness.

The expansion 18 is preferably configured as a circumferential contour, thus enabling the walls 19 and 20 to merge so that, for example, an oval shaped funnel is formed. In so doing, forces acting on the housing 16 in all spatial directions can be well absorbed. The stepped configuration of the expansion 18 depicted in FIG. 2 is only one option. It is, of course, also conceivable to provide the walls 19 and 20 with smooth surfaces. Alternatively or additionally the expansion 18 can also allow for curved regions. The welded connection at the contact point 23 is preferably carried out by suitable processes, such as, for example, an ultrasonic, hot plate, laser or induction welding process.

Figure 3:
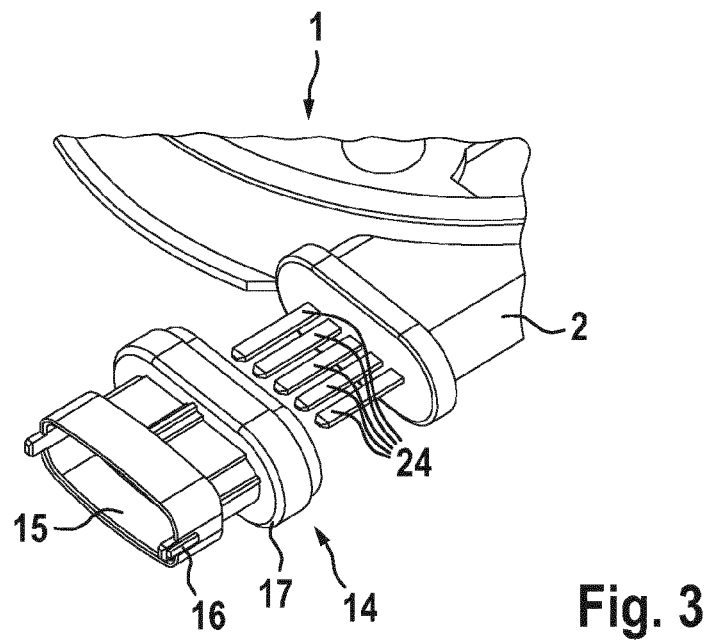
FIG. 3 shows the plug connector in a first exploded view.
Figure 4:
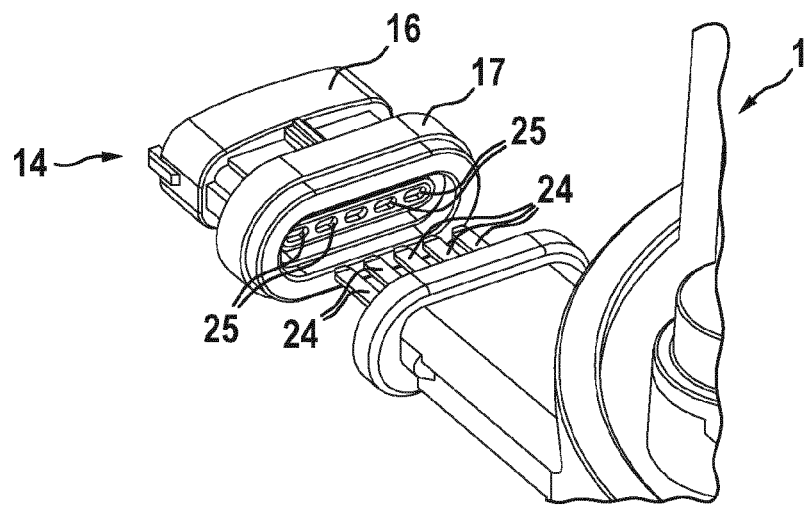
FIG. 4 shows the plug connector in a second exploded view.

FIGS. 3 and 4 show the assembly process of the plug connector 14 in two different perspective views. FIG. 3 show the connecting cables or contacts 24 coming out of the insert part 2, which cables are configured as contact lances. FIG. 4 shows the side of the housing 16 facing the insert part 2 as well as the intermediate piece 17. It can thereby be seen that the intermediate piece 17 frames or rather completely surrounds the connecting cables or contacts 24 in the assembled state. During assembly, the connecting lances or, respectively, connecting cables or contacts 24 are inserted into the corresponding channels 25 in the housing 16 until the intermediate piece 17 rests against the insert part 2. Said intermediate piece 17 is then welded to the insert part 2 by means of a welding process mentioned above and a leak-tight and resilient connection is produced.

Figure 5:
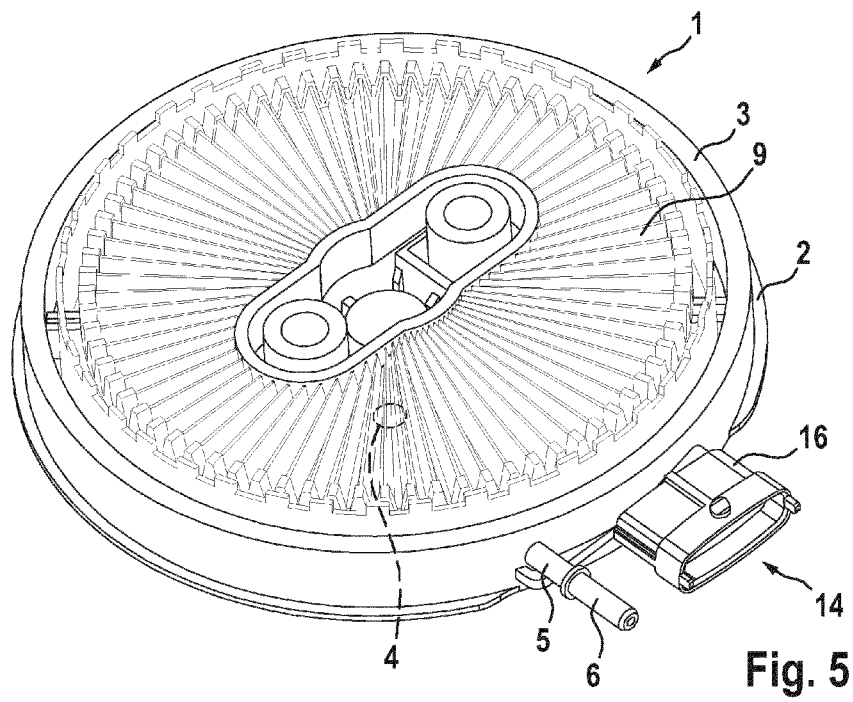
FIG. 5 shows an alternative embodiment of the liquid extraction module in a perspective view and FIG. 6 shows a housing of the plug connector of the liquid extraction module pursuant to the alternative embodiment.

According to an alternative exemplary embodiment, the insert part 2 is sprayed directly onto the housing 16 in the region of the undercut 22. For this purpose, FIG. 5 shows the liquid extraction module 1, which provides a solution without the intermediate piece in place of the two component plug provided as described above. To this end, the housing 16 of the plug connector 14 is directly encapsulated by the material of the insert part 2 at the region thereof comprising the undercut 22.

Figure 6:
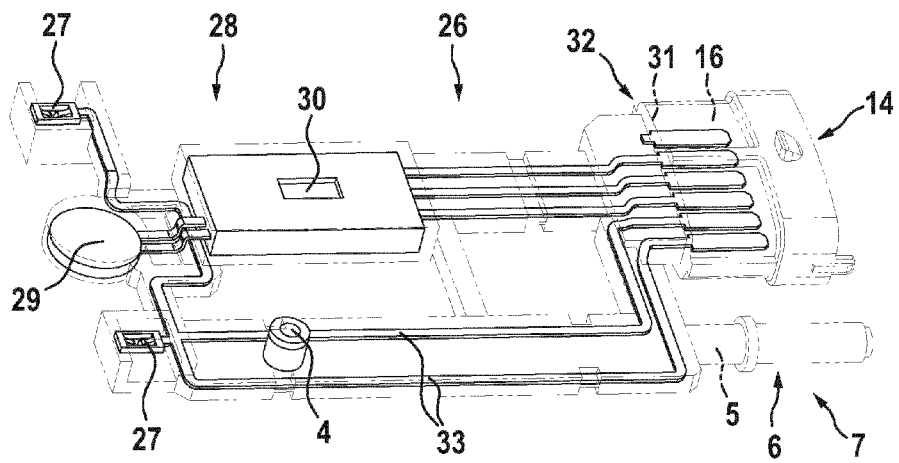

FIG. 6 shows an assembly 26, which, besides the housing 16 for the plug connector 14, comprises connection terminals 27 for the heating element 10 as well as a fill level detection device 28, which comprises a contactless operating fill level sensor 29 as well as an evaluation unit, which are all encapsulated by the material of the housing 16. The fuel level indicator 29 is advantageously embodied as an ultrasonic sensor. During assembly, the assembly 26 is preferably totally encapsulated by the material of the insert part 2 so that said assembly is completely integrally formed or, respectively, disposed in the insert part 2. Only the connecting tube 7 as well as the plug connector remains free from the material of the insert part 2. In the present exemplary embodiment pursuant to FIG. 6, the housing 16 has only a small projection 31, which extends over the circumference thereof and forms an undercut 32. If need be, the projection 31 can also be omitted because the complex design of the assembly 26 already forms sufficient undercuts for the material of the insert part 2.

In the present exemplary embodiment pursuant to FIG. 6, the assembly furthermore comprises the extraction channel 6 as well as the extraction opening 5. Two of the connecting cables or contacts 24 are guided in sections parallel to the extraction channel 6 and are preferably embodied as heating cables so that when putting the heating element 10 into operation, the extraction channel 6 is simultaneously heated up and if need be thawed by means of the heating cables 33.

The invention claimed is:

1. A liquid extraction module (1) for extracting liquid from a liquid tank, having an insert part (2) which is produced at least substantially from plastic and which has at least one extraction opening (4) and at least one plug connector (14) containing contacts (24) for the electrical contacting of an electrical consumer (10, 7) of the liquid extraction module (1), characterized in that a housing (16) of the plug connector (14) is formed separately from the insert part (2) and comprises at least one undercut (22) that is encapsulated by an intermediate piece (17) molded about the at least one undercut (22), the molded intermediate piece (17) being connected to the insert part (2) for fastening the housing (16) of the plug connector (14) to the insert part (2).

2. The liquid extraction module according to claim 1, characterized in that the undercut (22) extends generally in a plugging direction of the plug connector (14).

3. The liquid extraction module according to claim 1, characterized in that the housing (16) is produced from another material than that of the insert part (2) and the intermediate piece (17) from a material which can be welded to the insert part (2).

4. The liquid extraction module according to claim 1, characterized in that the intermediate piece (17) is produced from the same material as the insert part (2).

5. The liquid extraction module according to claim 1, characterized in that the undercut (22) extends over an entire width of the housing (16).

6. The liquid extraction module according to claim 1, characterized in that the housing (16) of the plug connector (14) has at least one expansion (18) which, viewed in cross-section, is funnel-shaped and forms the undercut (22).

7. The liquid extraction module according to claim 1, characterized in that the insert part (2) and/or the intermediate piece (17) are produced from high-density polyethylene.

8. The liquid extraction module according to claim 1, characterized in that the housing (16) is produced from polyamide.

9. A liquid tank having a tank opening and comprising a liquid extraction module (1), which is disposed in/on the liquid tank so as to close the tank opening, and which has an extraction opening (4) associated with the tank interior, and at least one plug connector (14), which is accessible from outside the tank, for the electrical contacting of an electrical consumer (10, 7) of the liquid extraction module (1), the liquid extraction module (1) further including an insert part (2) which is produced at least substantially from plastic and which includes the extraction opening (4), the at least one plug connector (14) having a housing (16) formed separately from the insert part (2) and comprises at least one undercut (22) that is encapsulated by an intermediate piece (17) molded about the at least one undercut (22), the molded intermediate piece (17) being connected to the insert part (2) for fastening the housing (16) of the plug connector (14) to the insert part (2).

10. The liquid extraction module according to claim 1, characterized in that the plastic of the insert part (2), of the housing (16) and/or of the intermediate piece (17) comprises a bonding agent.

11. The liquid extraction module according to claim 1, characterized in that the plastic of the insert part (2), of the housing (16) and/or of the intermediate piece (17) comprises maleic anhydride.

12. The liquid extraction module according to claim 1, characterized in that the undercut (22) extends over a circumference of the housing (16).

13. The liquid extraction module according to claim 1, characterized in that the housing (16) is produced from polyamide with glass fiber reinforcement.

\* \* \* \* \*